United States Patent [19]
Okochi et al.

[11] Patent Number: 5,396,410
[45] Date of Patent: Mar. 7, 1995

[54] ZERO CURRENT SWITCHING RESONANT CONVERTER

[75] Inventors: Sadao Okochi, Fussa; Terutaka Takoda, Ome, both of Japan

[73] Assignee: Kabushiki Kaisha Toshiba, Kanagawa, Japan

[21] Appl. No.: 108,281

[22] Filed: Aug. 19, 1993

Related U.S. Application Data

[63] Continuation of Ser. No. 674,341, Apr. 23, 1991, abandoned.

[30] Foreign Application Priority Data

Jan. 31, 1990 [JP] Japan .................................. 2-20885

[51] Int. Cl.6 .......................................... H02M 3/335
[52] U.S. Cl. .................................... 363/21; 363/97; 363/131; 323/235; 323/271
[58] Field of Search .................. 363/17, 19, 21, 23, 363/25, 28, 74, 78, 97, 131; 323/235, 271, 282, 290

[56] References Cited

U.S. PATENT DOCUMENTS

| | | | |
|---|---|---|---|
| 4,720,667 | 1/1988 | Lee et al. | 323/271 |
| 4,720,668 | 1/1988 | Lee et al. | 323/271 |
| 4,785,387 | 11/1988 | Lee et al. | 363/21 |
| 4,823,249 | 4/1989 | Garcia, II | 363/48 |
| 4,857,822 | 8/1989 | Tabisz et al. | 323/282 |
| 4,860,184 | 8/1989 | Tabisz et al. | 363/17 |
| 4,866,367 | 9/1989 | Ridley et al. | 323/287 |
| 4,931,716 | 6/1990 | Jovanovic et al. | 323/285 |
| 5,315,496 | 5/1994 | Okochi et al. | 363/21 |

OTHER PUBLICATIONS

Secondary-side resonance for high frequency power conversion, Lee et al IEEE Applied Power electronics conference (New Orleans) Apr. 28–May 1, 1986 pp. 83–89.
K. Liu, R. Oruganti, F. C. Lee, Resonant Switches-Topologies and Characteristics, 1985, pp. 106–116.
R. B. Ridley, A. Lotfi, V. Vorperian, F. C. Lee, Design and Control of a Full Wave, Quasi-Resonant Flyback Converter, 1988, pp. 41–49.
S. Okochi, E. Matsutami, Output Characteristics of a Flyback Converter, Electric Society National Convention (Japan) No. 584, pp. 5–154.

*Primary Examiner*—Steven L. Stephan
*Assistant Examiner*—Adolf Berhane
*Attorney, Agent, or Firm*—Finnegan, Henderson, Farabow, Garrett & Dunner

[57] ABSTRACT

The current resonant converter according comprises a voltage converting transformer having a primary winding and a secondary winding, a switching circuit, disposed on the primary side of the transformer, for turning on and off a current supplied from an DC power to the transformer, a resonant circuit disposed adjacent to the transformer, a rectifying and smoothing circuit, disposed on the secondary side of the transformer, for supplying an output to a load, and a control circuit for controlling a switching frequency of the switching circuit, whereby the current resonant converter is operated in two modes, consisting of a first mode for prohibiting a DC current component from flowing in the primary winding and a second mode for allowing the DC current component to flow in the primary winding. Thus, since the allowable changing ranges of the input voltage and the load current is widened, the zero current switch can be stably operated and the peak value of current which flows in the switching device such as switching device can be decreased and thereby reducing the cost and size.

2 Claims, 9 Drawing Sheets

(MODE 1) STATE 1→2→3→4→1

(MODE 2) STATE 1→2→3→5→1

α = 0.323

WAVEFORM OF INPUT CURRENT
$\hat{i}_{A1}$ AT POINT A

WAVEFORM OF INPUT CURRENT
$\hat{i}_{A1}$ AT POINT D

ZERO CURRENT SWITCHING RESONANT CONVERTER

This application is a continuation of application Ser. No. 07/674,341, filed Apr. 23, 1991, now abandoned.

BACKGROUND OF THE INVENTION

The present invention relates to a current resonant converter such as a flyback current resonant converter for obtaining a particular DC voltage from another DC power voltage.

Thus far, a flyback current resonant converter has been widely used as a power device for various electronic units.

In such a current resonant converter, with respect to the protection and efficiency of a switching device, it should be turned on and off when a current which flows in a series resonant circuit is zero (hereinafter, this operation is named the "zero current switching").

However, in the conventional current resonant converter, even if the changing ranges of a load current and an input voltage are known, the circuit constants of the current resonant converter are not determined with them. Thus, the zero current switching cannot be always accomplished in the optimum timing.

Consequently, it is necessary to use a switching device and other parts with current ratings which exceed those actually required and thereby increasing the size and cost thereof.

On the other hand, when a frequency modulation control is performed so that the output voltage is stably kept in the full changing ranges of the input voltage and the load current, the sine component of the current which flows in the switching device becomes very small and thereby disabling the turn-off operation by the zero current switching.

In particular, when the load is light, a dummy load should be provided so that the apparent load exceeds a predetermined value even if no load is applied. Thus, the cost performance is remarkably decreased.

As was described above, in the conventional current resonant converter, with the changing ranges of the load current and the input voltage, the optimum operating point of the switching device cannot be determined. Thus, it is difficult to stably operate the stable zero current switching. In addition, it is necessary to use a part with current rating which exceeds that actually required and a dummy load or the like.

SUMMARY OF THE INVENTION

An object of the present invention is to solve the above mentioned problems and to provide a current resonant converter for widening the available changing ranges of the input voltage and the load current so as to improve the stability of the zero current switching operation and for decreasing the peak value of current which flows in a circuit part such as a switching device so as to keep the current rating of the circuit part low and thereby reducing the cost and size thereof.

To accomplish the above purpose, the current resonant converter according to the present invention comprises a voltage converting transformer having a primary winding and a secondary winding, a switching circuit, disposed on the primary side of the transformer, for turning on and off a current supplied from an DC power to the transformer, a resonant circuit disposed adjacent to the transformer, a rectifying and smoothing circuit, disposed on the secondary side of the transformer, for supplying an output to a load, and a control circuit for controlling a switching frequency of the switching circuit, whereby the current resonant converter is operated in two modes, consisting of a first mode for prohibiting a DC current component from flowing in the primary winding and a second mode for allowing the DC current component to flow in the primary winding.

In the current resonant converter according to the present invention, since the switching circuit is operated in the first operation mode where the switching circuit is turned on in the timing that the DC component does not flow in the primary winding and in the second operation mode where the switching circuit is turned on in the timing that the DC component flow in the primary winding, the allowable changing ranges of the input voltage and the load current are widened. Thus, the zero current switching is stably operated and the peak value of current which flows in the circuit device such as switching device is decreased and thereby reducing the cost and size thereof.

As was described above, according to the current resonant converter of the present invention, the allowable changing ranges of the input voltage and the load current can be widened. Thus, the zero current switching can be stably operated and the peak value of current which flows in a circuit device such as a switching device can be decreased and thereby reducing the cost and size thereof.

DESCRIPTION OF THE PREFERRED EMBODIMENT(S).

With reference to the accompanying drawings, embodiments according to the present invention will be described in the following.

Figure 1:
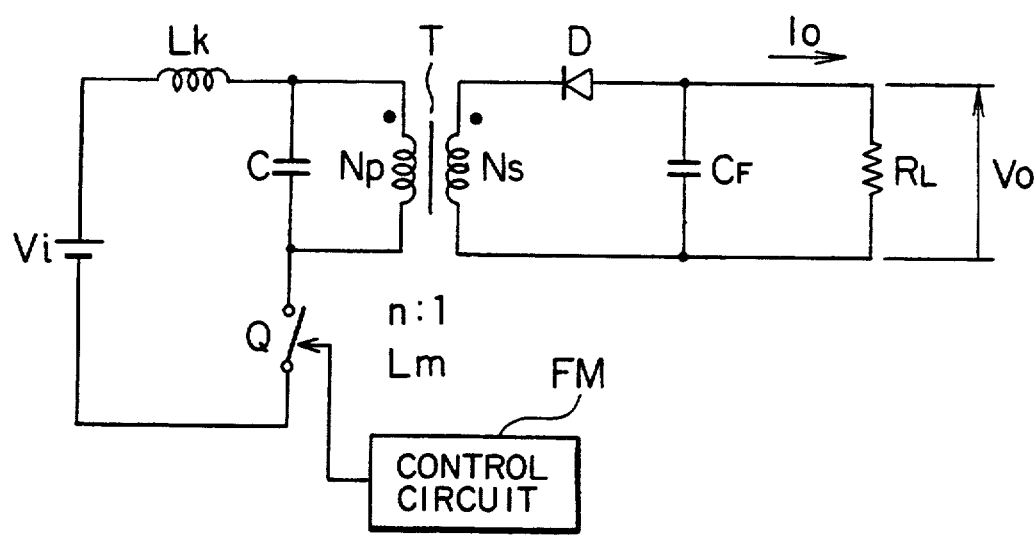
FIG. 1 is a block diagram showing the structure of a current resonant converter of an embodiment according to the present invention.

FIG. 1 is a block diagram showing the structure of a fly-back current resonant converter of an embodiment according to the present invention.

In the figure, a series resonant circuit is composed of a DC power Vi, a resonant inductor Lk, and a resonant capacitor C, each of which is connected in series. A switching device Q is connected to the series resonant circuit in series. A transformer T (where the turns ratio is n:1) has a primary winding Np which is connected to the resonant capacitor C in parallel for obtaining an AC voltage which is generated due to electric charges oscillated between the resonant capacitor C and the primary winding Np when the switching device Q is turned off. A rectifying and smoothing circuit is composed of a secondary diode D which is connected in series with a secondary winding Ns of the transformer T and a smoothing capacitor CF. A control circuit FM varies a switching frequency of the switching device Q so as to increase and decrease the amount of energy supplied to a load RL and thereby matching an output voltage Vo with a reference voltage. A control circuit FM operates and switches the switching device Q to either of a first move or second mode described later in accordance with conditions of the input side or output side.

Figure 2:
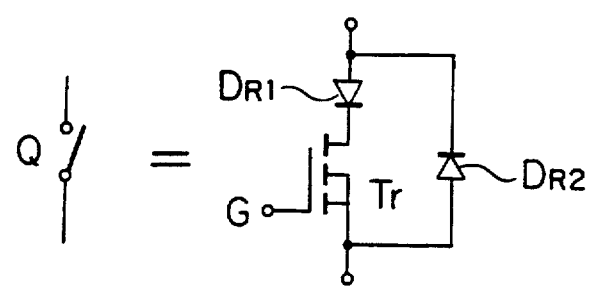
FIG. 2 is a schematic showing the structure of a switching circuit.

FIG. 2 is a schematic showing the structure of a switching device. As shown in the figure, the switching device Q is composed of a transistor Tr, and diodes DR1 and DR2. The diodes DR1 and DR2 flows a current to the switching device Q only in the forward direction of the series resonant circuit.

Now, the operation of the current resonant converter in the aforementioned structure will be described.

Figure 3:
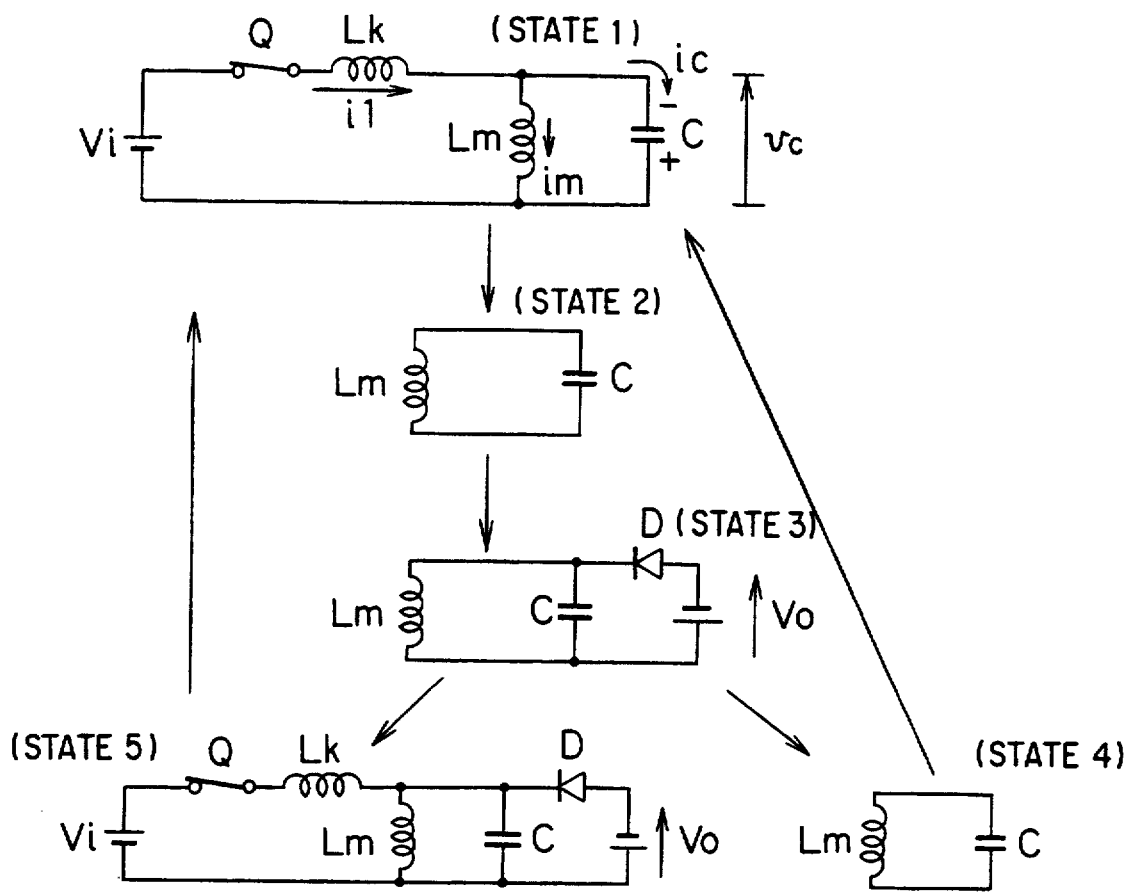
FIG. 3 is a schematic showing two types of operation modes.
Figure 4:
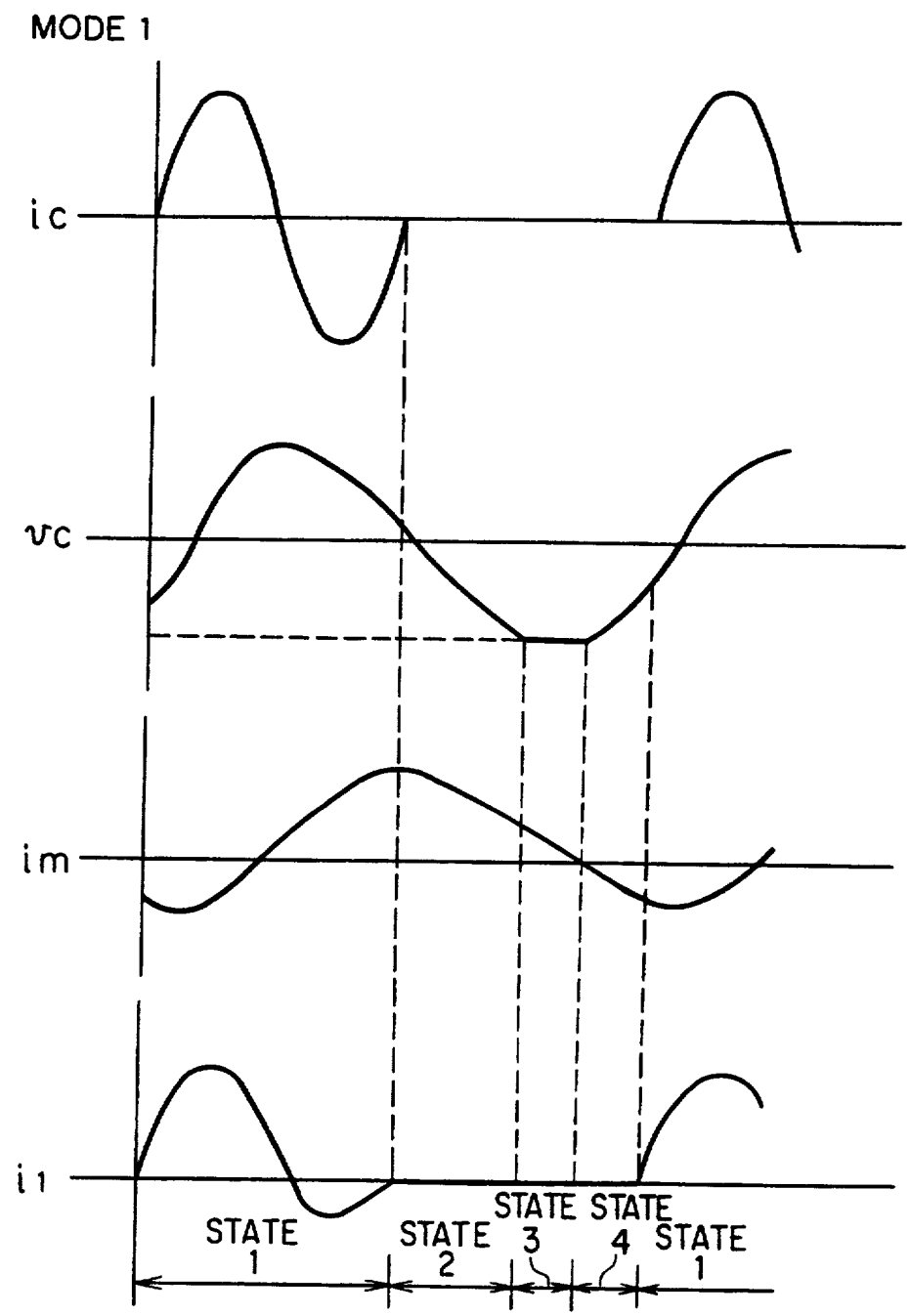
FIG. 4 is a diagram showing waveforms of signals of individual portions in the mode 1.
Figure 5:
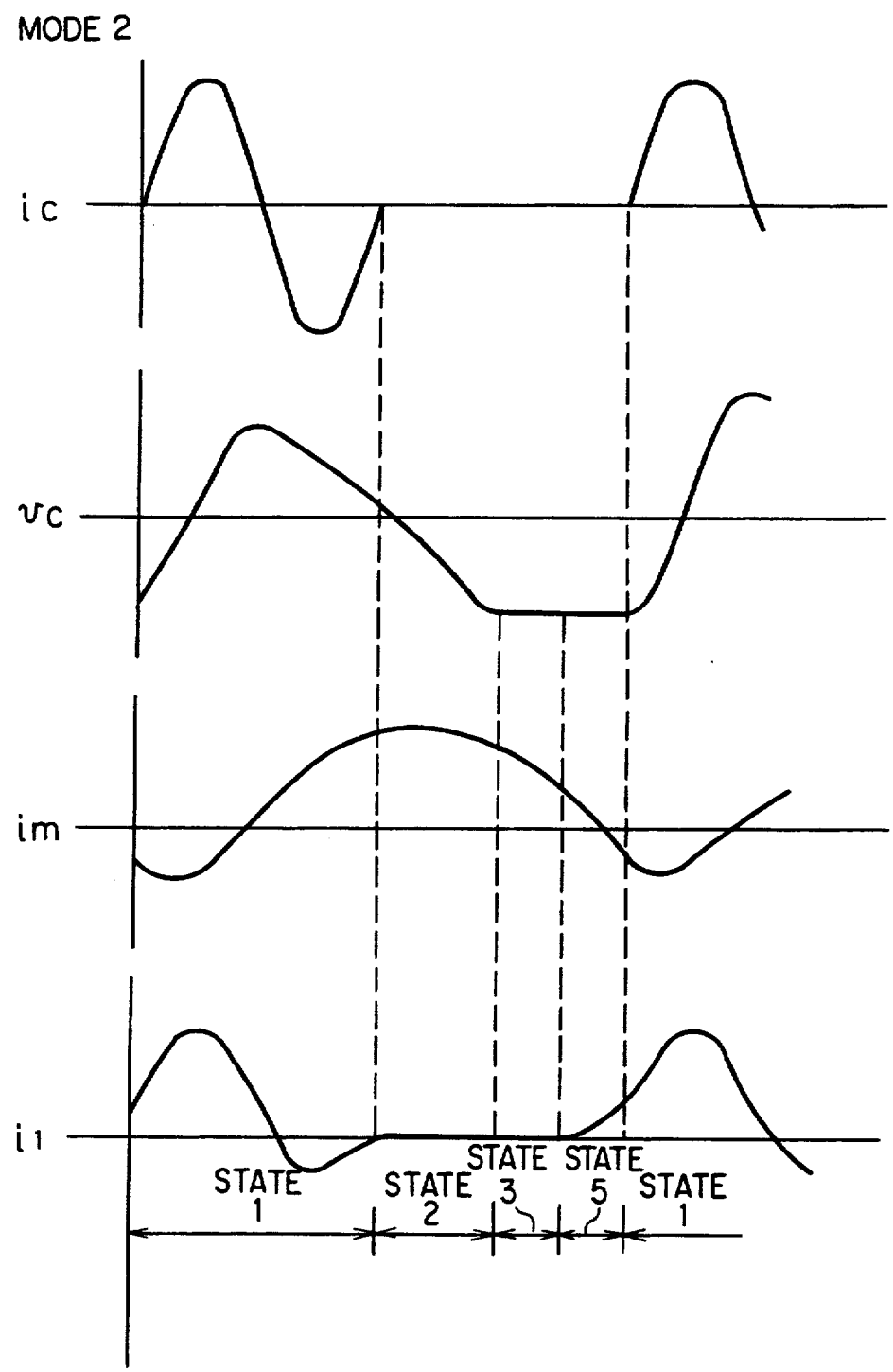
FIG. 5 is a diagram showing waveforms of signals of individual portions in the mode 2.

FIG. 3 is a schematic showing the state transitions of the current resonant converter shown in FIG. 1. FIG. 4 is a schematic showing waveforms of signals in individual portions in mode 1. FIG. 5 is a schematic showing waveforms of signals in individual portions in mode 2. In FIG. 4 and FIG. 5, ic is a current which flows in the capacitor C; vc is a voltage applied to the capacitor C; im is a current which flows in a magnetizing inductance Lm; and i1 is a current which flows in a resonant inductor Lk.

In FIG. 3, in the states 1 and 5, the switching device Q is turned on; in the states 3 and 5, the diode D is turned on; and in the states 2 and 4, an oscillation takes place between the magnetizing inductor Lm of the transformer T and the resonant capacitor C.

The current resonant converter is operated in two types of operation modes. The two types of the operation modes are mode 1 where the states are changed in the order of 1→2→3→4→1 and mode 2 where the states are changed in the order of 1→2→3→5→1 as shown in FIG. 1.

First, the operation of the mode 1 will be described. As shown in FIG. 4, in the state 1, when the switching device Q is turned on, the resonant current i1 which flows in the resonant inductor Lk is sinusoidally oscillated and thereby electric charges are stored in the resonant capacitor C.

At that time, the positive half wave flows in the switching device Q through the diode DR1. In contrast, the negative half wave flows in the diode DR2 disposed in parallel with the switching device Q. While the negative half wave is flowing, a drive signal for driving the switching device Q is turned off. Thus, while the current which flows in the switching device Q is zero, it is turned off. This operation is named the zero current switching or ZCS.

In the state 2, when the switching device Q is turned off, the electric charges stored in the resonant capacitor C are oscillated between it and the magnetizing inductor Lm. Thus, the energy stored in the magnetizing inductor Lm through the transformer T is discharged to the load side through the secondary diode D in the state 3.

When all the energy stored in the magnetizing inductor Lm is discharged to the load side (when im=0), the state 4 takes place. In the state 4, the electric charges stored in the resonant capacitor C are oscillated between it and the magnetizing inductor Lm and thereby the electric charges are stored in the resonant capacitor C.

Thereafter, the state 1 takes place again. In the state 1, the switching device Q is turned on and thereby the resonant electric charges are stored in the resonant capacitor C.

In the same manner as described above, the state 1, state 2, state 3, state 4, state 1, state 2, state 3, . . . , etc. repeatedly take place in the order.

Then, the operation of the mode 2 will be described. As shown in FIG. 5, after the same operation as the mode 1 is performed in the states 1 and 2, the state 3 takes place. In the state 3, before the energy stored in the magnetizing inductor Lm has not been fully discharged to the load side (before im=0), the switching device Q is turned on and then the state 5 takes place.

Thereafter, the state 1 takes place. After that, in the same manner as described above, the state 2, state 3, state 4, state 5, state 1, . . . , etc. repeatedly take place in the order.

Assume that the periods in accordance with the states 1, 2, 3, 4, and 5 are defined as T1, T2, T3, T4, and T5, respectively. In the state 4 of the mode 1, the control circuit controls the period T4 so as to keep the output voltage VO constant. Thus, the control circuit determines the switching period T (=T1+T2+T3+T4). On the other hand, in the mode 2, the control circuit adds or subtracts the period T3 in the state 3 so as to determine the switching period T (=T1+T2+T3+T5).

At an operating point at the boundary of the mode 1 and the mode 2, since the current im which flows in the magnetizing inductor Lm at the end of the state 3 becomes zero, on the mode 1 side of the boundary, T4=0 and thereby T=T1+T2+T3; on the mode 2 side of the boundary, T5=0 and thereby T=T1+T2+T3. Thus, the mode 1 and the mode 2 are connected.

In other words, when the switching period T is gradually decreased (namely, the switching frequency (=1/T) is increased), the mode 1 repeatedly takes place twice or more times and thereby the period T4 becomes gradually short. When the period T4 becomes zero, the mode 2 takes place. Thereafter, the mode 2 repeatedly takes place twice or more times and thereby the period T3 becomes gradually short. Thus, in the state 3, the final value of the current im which flows in the magnetizing inductor Lm increases.

In the mode 2, before the current im which flows in the magnetizing inductor Lm in the state 3 becomes zero, the state 5 takes place. Thus, the DC component flows in the magnetizing inductor Lm and thereby the core of the transformer T is exposed to the DC magnetization. To prevent the core from being magnetically saturated, an air gap is provided at the core of the transformer T. The current resonant converter is operated in the two operation modes so as to widen the available changing ranges of the input/output voltage ratio and the load current.

Now, the method of widening such available ranges will be described in the following.

Figure 6:
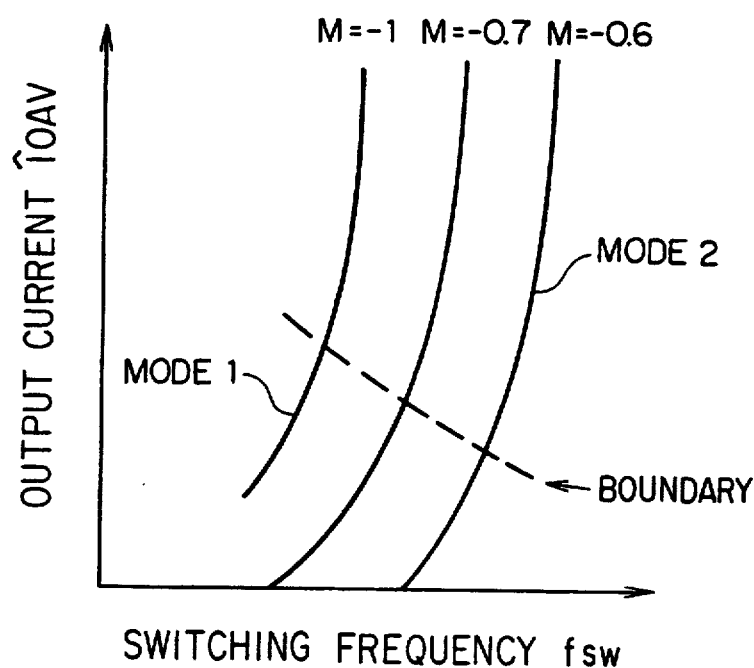
FIG. 6 is a diagram showing the relationship between a switching frequency and an output current in the current resonant converter shown in FIG. 1.
Figure 7:
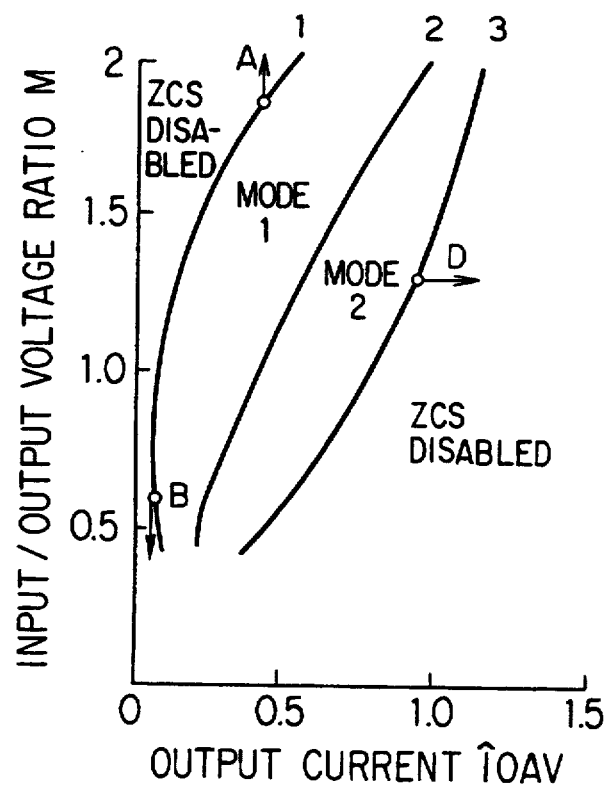
FIG. 7 is a diagram showing the relationship between the output current and an input/output voltage ratio of the current resonant converter shown in FIG. 1, the output voltage being kept constant.

FIG. 6 is a diagram showing the relationship between a switching frequency fSW and an output current (load current) IOAV, where hat marking " " stands for normalized quality. FIG. 7 is a diagram showing the relationship between the output current IOAV and an input/output voltage ratio M, the output voltage being kept constant. With Z0 (resonant impedance)=$(Lk/C)^{\frac{1}{2}}$, $\alpha$=Lk/Lm, Ibase (reference current)=Vo/Z0, and M=Vi/Vo, various factors are normalized. Thus, the output current IOAV=IO/Ibase.

In FIG. 7, curve 1 represent a boundary between an area where the turn-off operation by the zero current switching becomes disabled and the mode 1; curve 2 represents a boundary between the mode 1 and the mode 2; and curve 3 represents a boundary between an area where the turn-off operation by the zero current switching becomes disabled and the mode 2.

As shown in the figure, when the current resonant converter is operated between the mode 1 and the mode 2, the allowable changing ranges of the input/output voltage ratio M and the output current IOAV become wider than those when the current resonant converter is operated in either the mode 1 or the mode 2.

Figure 8:
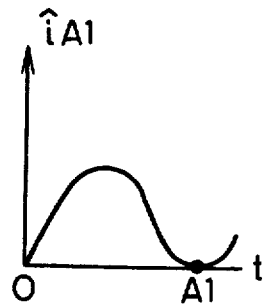
FIG. 8 and FIG. 9 are diagrams showing waveforms of input currents at particular points on the curves shown in FIG. 7.

As shown in FIG. 8, at point A on the curve 1, a current iA1 which flows in the switching device Q increases from zero and then oscillationally becomes zero on the time axis as the minimum point A1. When the input/output voltage ratio M increases after the point A, the input current iA1 at the minimum point A1 becomes larger than zero. Thus, with the zero current switching, the turn-off operation (ZCS turn-off) cannot be performed.

On the other hand, at the point B on the curve 1, when the capacitor voltage oscillates in the state 2, the capacitor voltage does not increase until it becomes the value of the output voltage Vo. Thus, when the input/output voltage ratio M drops from this point, the capacitor voltage does not increase to the value of the output voltage Vo and thereby the state 3 does not takes place and the power is not transferred to the load.

Figure 9:

On the other hand, as shown in FIG. 9, at the point D on the curve 3, the current iA1 which flows in the switching device Q becomes zero at the minimum point D1 and contacts the time axis. When the load current IOAV increases, the DC component of the current which flows in the magnetizing inductor Lm increases. Thus, in the state 1, the minimum value of the resonant current rises from zero and thereby the ZCS turn-off is disabled.

Figure 10:
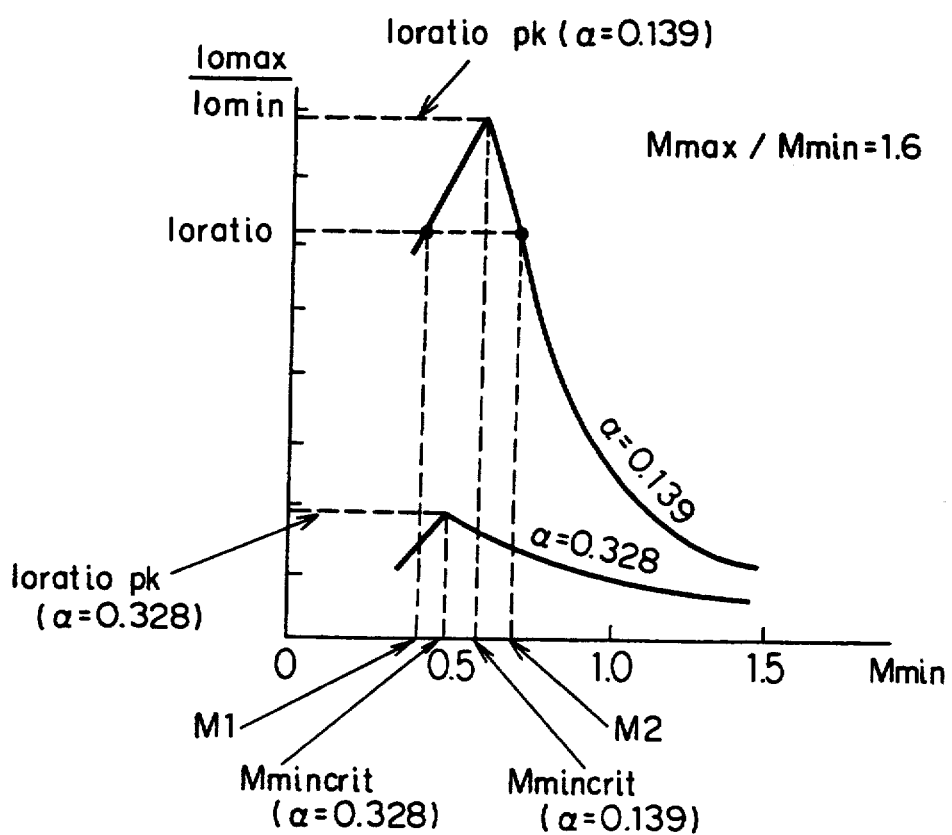
FIG. 10 and FIG. 11 are diagrams showing the relationship between a minimum input/output voltage ratio and a maximum/minimum load current ratio.
Figure 11:
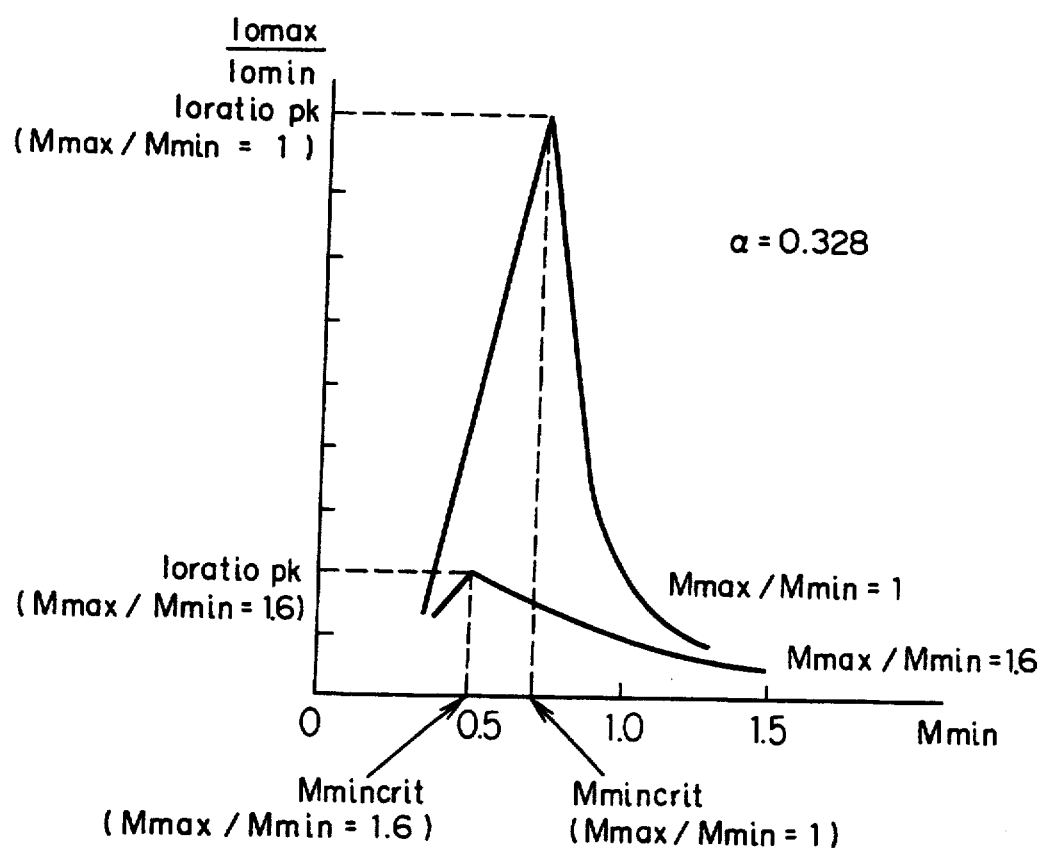

FIG. 10 is a diagram showing the relationship between Mmin and Iomax/Iomin when the output voltage is kept constant, the changing range (Mmax/Mmin) of the input voltage being 1.6, $\alpha$(=Lk/Lm) being 0.139 and 0.328. FIG. 11 is a diagram showing the relationship between Mmin and Iomax/Iomin when the output voltage is kept constant, $\alpha$ being constant, the changing range (Mmax/Mmin) of the input voltage being 1.0 and 1.6.

In the figures, Mmax is the maximum value of the input/output voltage ratio M; Mmin is the minimum value of the input/output voltage ratio M; Iomax/Iomin is the ratio of the maximum value and the minimum value of the load current Io (=Ioratio); and Mmincrit is the value of Mmin when Ioratio becomes maximum.

As shown in FIG. 10, when $\alpha$ being selected is a small value, the controllable range from Iomin to Iomax can be widened.

As shown in FIG. 11, when $\alpha$ is constant (0.328), Iomax/Iomin (=Ioratio) for a particular Mmin becomes maximum (Ioratio pk). This point takes place when Mmin ranging from around 0.5 to around 0.7. Thus, for a load where the changing range from Iomin to Iomax is large, as the operating point of the current resonant converter, it is preferable for Mmin to select a value in the range from around 0.5 to around 0.7.

Figure 12:
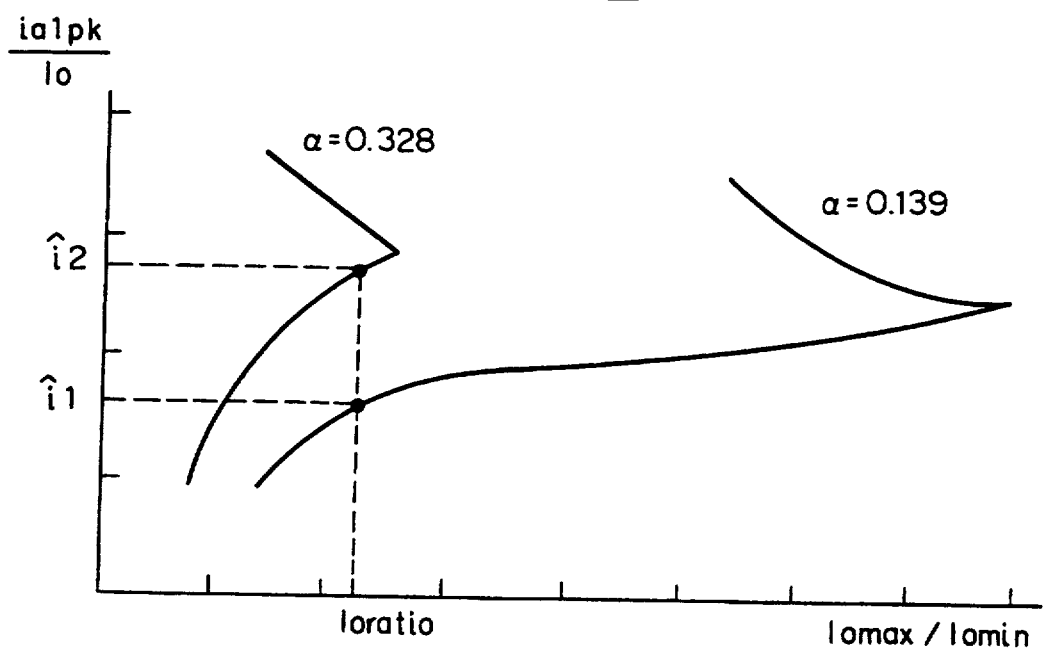
FIG. 12 is a diagram showing the relationship between the maximum/minimum load current ratio and the ratio of an input current peak value and the load current.

FIG. 12 is a diagram showing the relationship between Iomax/Iomin and ialpk/Io, which is the ratio of the peak value of the input current against the load current. In the figure, Ioratio is a value of Iomax/Iomin; i1 is a value of ialpk/Io against Ioratio when $\alpha$ is 0.139; and i2 is a value of ialpk/Io against Ioratio when $\alpha$ is 0.328.

As shown in the figure, when a particular value of load current range Iomax/Iomin is given, as the value of $\alpha$ is small, the value of ialpk/Io becomes small and thereby decreasing the peak value of the current which flows in the switching device Q. Thus, the stress of current applied to the switching device Q against the same load current can be decreased.

In addition, as shown in FIG. 10, two Mmin's, namely, M1 and M2 (M1<M2), can be used in the vicinity of Mmincrit against the same Iomax/Iomin (Ioratio). However, as shown in FIG. 12, the value of ialpk/Io of M2 is smaller than that of M1. Thus, with a value of M2 being properly selected, the stress of the switching device Q can be decreased against the same Iomax/Iomin.

From the aforementioned description, the key points of the current resonant converter according to the embodiment can be summarized as follows.

(1) When the current resonant converter is operated in the mode 2, since the magnetic core of the transformer is exposed to the DC magnetization, an air gap is provided at part of the core so as to prevent it from being magnetically saturated by the DC magnetization.

(2) When the air gap is provided, the magnetizing inductance Lm decreases in comparison with the case where the air gap is not provided. To prevent that, the peak value (ialpk/Ioav) of current which flows in the switching device Q is decreased and thereby $\alpha$ (=Lk/Lm) is decreased.

(3) When the changing ratio of input voltage (Mmax/Mmin) is around 1.6, by increasing the ratio of Iomax/Iomin, the control range can be widened. Thus, the turns ratio of n:1 of the transformer T is determined so that Mmin is in the range from 0.5 to 0.7.

(4) Against a load with a change of load current Io which is smaller than the maximum value of Iomax/Iomin accomplished for a particular value of $\alpha$, a value of Mmin which is larger than that at which Iomax/Iomin is maximum is selected so as to decrease ialpk/Io.

With the above mentioned means, the operating point of the current resonant converter can be optimized.

Then, other embodiments according to the present invention will be described.

Figure 13:
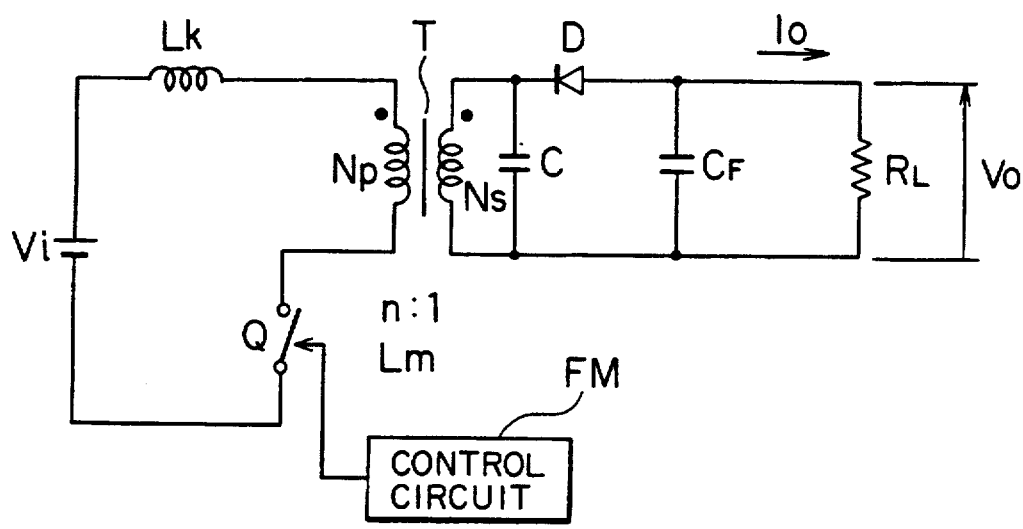
FIG. 13 to FIG. 15 are diagrams showing the structures of current resonant converters of other embodiments according to the present invention.

A current resonant converter shown in FIG. 13 is provided with the capacitor C of the current resonant converter shown in FIG. 1 on the secondary side of the transformer T. With such a current resonant converter, the same effect as that shown in FIG. 1 can be obtained.

Figure 14:
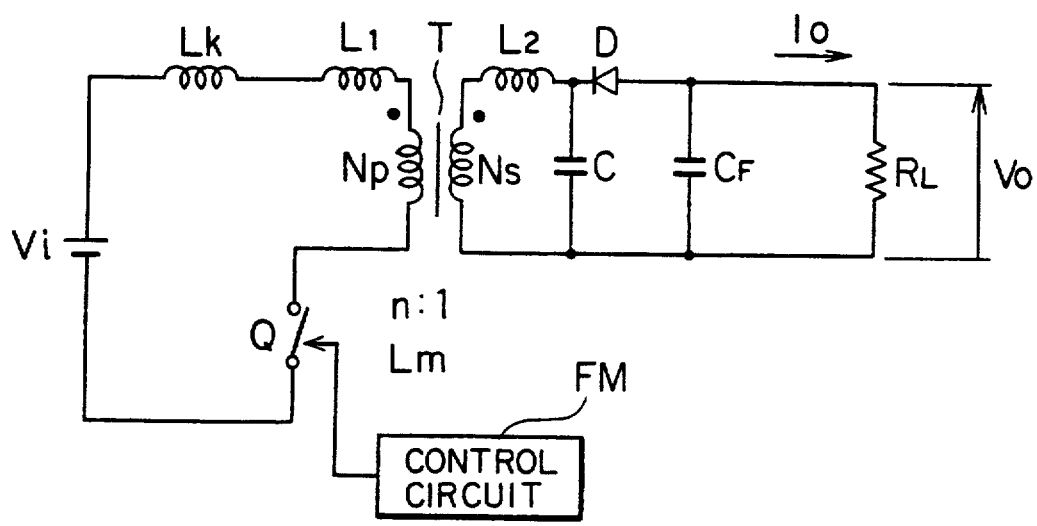

A current resonant converter shown in FIG. 14 uses leakage inductances L1 and L2 of the transformer T along with the magnetizing inductor Lk of the current resonant converter shown in FIG. 1.

Figure 15:
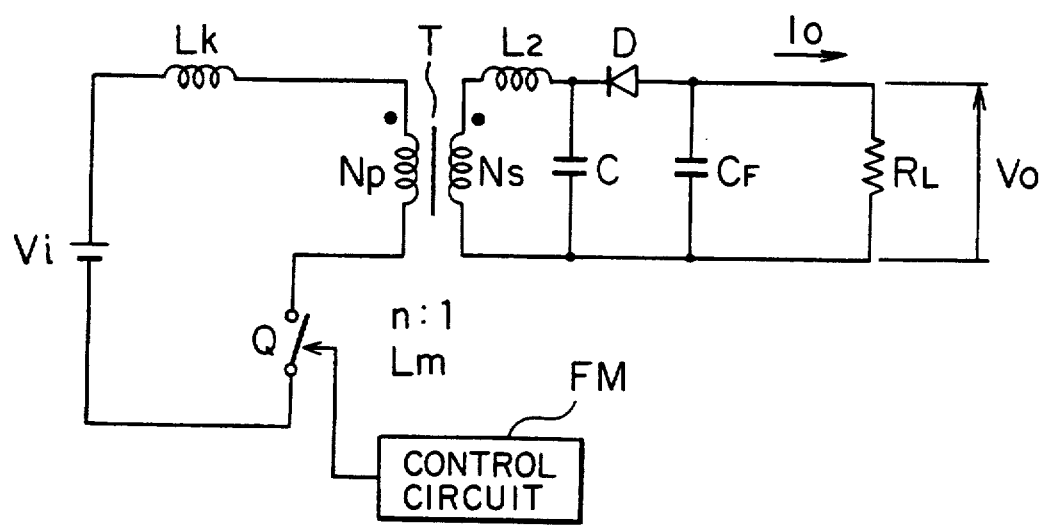

A current resonant converter shown in FIG. 15 uses the leakage inductances L1 and L2 of the transformer T instead of the magnetizing inductor Lk.

As was described above, by using the leakage inductances of the transformer T, it is possible to remove the dedicated resonant inductance or decrease its value.

What is claimed is:

1. A method of controlling a switching device connected with a DC power supply in a primary side of a voltage transformer included in a flyback current resonant converter, the method comprising the steps of:

controlling a switching frequency of the switching device;

operating the current resonant converter in a first mode by repetitively closing the switching device to draw current from the power supply at times when oscillating current flowing in the primary side of the voltage transformer goes to zero;

operating the current resonator converter in a second mode by repetitively closing the switch to draw current from the power supply in advance of the times the oscillating current flowing in the primary side of the voltage transformer goes to zero; and transferring between the first and second operating modes of the current resonant converter.

2. The method of claim 1, wherein the transferring step includes the step of raising the switching frequency of the switching device to transfer the current resonant converter from the first operating mode to the second operating mode in response to a change in a load connected in a secondary side of the voltage transformer.

* * * * *